US010223895B2

(12) United States Patent
Hermann et al.

(10) Patent No.: US 10,223,895 B2
(45) Date of Patent: Mar. 5, 2019

(54) SYSTEMS FOR MONITORING HAND SANITIZATION

(71) Applicant: Clean Hands Safe Hands LLC, Atlanta, GA (US)

(72) Inventors: Christopher D. Hermann, Atlanta, GA (US); Jeremy D. Jass, Atlanta, GA (US)

(73) Assignee: CLEAN HANDS SAFE HANDS LLC, Atlanta, GA (US)

( * ) Notice: Subject to any disclaimer, the term of this patent is extended or adjusted under 35 U.S.C. 154(b) by 0 days.

(21) Appl. No.: 16/043,607

(22) Filed: Jul. 24, 2018

(65) Prior Publication Data

US 2019/0005801 A1 Jan. 3, 2019

Related U.S. Application Data

(63) Continuation-in-part of application No. 15/392,500, filed on Dec. 28, 2016, now Pat. No. 10,032,359, which is a continuation of application No. 14/840,995, filed on Aug. 31, 2015, now Pat. No. 9,564,039, which is a continuation of application No. 13/639,669, filed as application No. PCT/US2011/031571 on Apr. 7, 2011, now Pat. No. 9,123,233, application No. 16/043,607, which is a (Continued)

(51) Int. Cl.
*G08B 21/24* (2006.01)
*G06F 19/00* (2018.01)

(52) U.S. Cl.
CPC .......... *G08B 21/245* (2013.01); *G06F 19/00* (2013.01); *Y10T 137/8158* (2015.04)

(58) Field of Classification Search
CPC combination set(s) only.
See application file for complete search history.

(56) References Cited

U.S. PATENT DOCUMENTS

| | | | | | |
|---|---|---|---|---|---|
| 5,202,666 | A * | 4/1993 | Knippscheer | G08B 7/06 | 340/541 |
| 5,223,182 | A * | 6/1993 | Steiner | A61L 9/122 | 261/26 |

(Continued)

FOREIGN PATENT DOCUMENTS

| | | | |
|---|---|---|---|
| EP | 1216505 | B1 | 6/2006 |
| KR | 1019940008109 | B1 | 9/1994 |
| KR | 219950009364 | Y1 | 10/1995 |

OTHER PUBLICATIONS

International Search Report and Written Opinion dated Nov. 6, 2014 mailed in International Application No. PCT/US2014/043278 filed on Jun. 19, 2014.

(Continued)

*Primary Examiner* — Travis R Hunnings
(74) *Attorney, Agent, or Firm* — Morris, Manning & Martin, LLP; Bryan D. Stewart

(57) ABSTRACT

The present systems and methods relate to a hand sanitizer system that includes a proximity detector, a dispensing system and an alarm feature, and is operative to provide an indication corresponding to a person in proximity of the system failing to dispense antiseptic or other solution from the dispenser within a predetermined period of time after moving within a predetermined range of the detector.

20 Claims, 10 Drawing Sheets

Related U.S. Application Data continuation-in-part of application No. 15/914,246, filed on Mar. 7, 2018.

(60) Provisional application No. 61/321,595, filed on Apr. 7, 2010, provisional application No. 62/468,158, filed on Mar. 7, 2017.

(56) References Cited

U.S. PATENT DOCUMENTS

| | | | | | |
|---|---|---|---|---|---|
| 5,619,188 | A * | 4/1997 | Ehlers | G08B 13/08 | 200/61.62 |
| 5,670,945 | A * | 9/1997 | Applonie | E03C 1/055 | 340/540 |
| 5,695,091 | A | 12/1997 | Winings et al. | | |
| 5,739,759 | A * | 4/1998 | Nakazawa | G08B 3/1025 | 340/7.62 |
| 6,166,640 | A * | 12/2000 | Nishihira | G08B 5/36 | 340/540 |
| 6,325,245 | B1 * | 12/2001 | Matthews | A47K 5/12 | 222/181.1 |
| 7,375,640 | B1 * | 5/2008 | Plost | A47K 5/1217 | 340/500 |
| 7,825,812 | B2 * | 11/2010 | Ogrin | G08B 21/245 | 222/175 |
| 2002/0135486 | A1 * | 9/2002 | Brohagen | G08B 21/245 | 340/573.1 |
| 2002/0150198 | A1 | 10/2002 | Thompson | | |
| 2002/0175815 | A1 * | 11/2002 | Baldwin | G01S 13/04 | 340/567 |
| 2004/0090333 | A1 | 5/2004 | Wildman et al. | | |
| 2004/0196612 | A1 * | 10/2004 | Kraz | A61N 1/14 | 361/220 |
| 2005/0242942 | A1 * | 11/2005 | Staats | G08B 3/10 | 340/506 |
| 2007/0121319 | A1 * | 5/2007 | Wolf | A01M 1/2083 | 362/231 |
| 2007/0257803 | A1 * | 11/2007 | Munro | G08B 21/245 | 340/573.1 |
| 2007/0279238 | A1 * | 12/2007 | Smith | G01S 17/026 | 340/686.6 |
| 2008/0103636 | A1 | 5/2008 | Glenn et al. | | |
| 2008/0131332 | A1 | 6/2008 | Nguyen et al. | | |
| 2009/0051545 | A1 * | 2/2009 | Koblasz | G08B 21/245 | 340/573.1 |
| 2009/0219131 | A1 * | 9/2009 | Barnett | G08B 21/245 | 340/5.2 |
| 2010/0117836 | A1 * | 5/2010 | Seyed Momen | G01S 1/70 | 340/573.1 |
| 2010/0134296 | A1 | 6/2010 | Hwang et al. | | |
| 2010/0282773 | A1 | 11/2010 | Lynn | | |
| 2010/0315244 | A1 | 12/2010 | Tokhtuev et al. | | |
| 2010/0328076 | A1 | 12/2010 | Kyle et al. | | |
| 2011/0025509 | A1 * | 2/2011 | Brow | A47K 5/06 | 340/573.1 |
| 2011/0112696 | A1 * | 5/2011 | Yodfat | G16H 40/40 | 700/283 |
| 2011/0169646 | A1 | 7/2011 | Raichman | | |
| 2011/0234407 | A1 * | 9/2011 | Harris | G08B 21/245 | 340/573.1 |
| 2011/0291840 | A1 | 12/2011 | Pelland et al. | | |
| 2011/0310071 | A1 * | 12/2011 | Segall | G09G 3/3406 | 345/207 |
| 2011/0316701 | A1 | 12/2011 | Alper et al. | | |
| 2012/0218106 | A1 | 8/2012 | Zaima et al. | | |
| 2012/0316497 | A1 | 12/2012 | Deutsch | | |
| 2013/0046153 | A1 | 2/2013 | Hyde et al. | | |
| 2013/0113291 | A1 | 5/2013 | Recker et al. | | |
| 2013/0122807 | A1 | 5/2013 | Tenarvitz et al. | | |
| 2013/0250823 | A1 | 9/2013 | Gaylard et al. | | |
| 2013/0262034 | A1 | 10/2013 | Iseri et al. | | |
| 2013/0331153 | A1 | 12/2013 | Krimstock | | |
| 2013/0342349 | A1 | 12/2013 | Cruz | | |
| 2014/0266730 | A1 | 9/2014 | Hines et al. | | |
| 2014/0361897 | A1 | 12/2014 | Smith et al. | | |

OTHER PUBLICATIONS

International Search Report dated Dec. 23, 2011 mailed in International Application No. PCT/US2011/031571 filed on Apr. 7, 2011.

* cited by examiner

```
list                p=12F508
#include            <p12F508.inc>
.config_MCLRE-OFF & _CP_OFF & _WDT_OFF &-intRC_OSC
            UDATA
sGPIO       res         1
            res         1
            res         1
            res         1
RCCAL       CODE 0x1FF
            res         1
MAIN   CODE 0x000
            movwf OSCCAL
start
            clrf    GPIO
            clrf    sGPIO
            movlw b'111101'
            tris    GPIO
waiting
            btfss   GPIO, 3
            goto    silenced
            btsf    GPIO,2
            goto    engaged
            goto    waiting
```

FIG. 5A

```
engaged         movlw
                movwf dc3
dly             movlw 244
                movwf dc2
                      dc1
check  btfss    GPIO,
                      silenced
dly1   nop
                decfaz dc1
                      dly1
dly2   nop
                      dc1
                      dly2
                decfsz dc2
                      check
                      dc3
                      dly
                      alarm
alarm                 GPIO
                      GPIO
                      alarm
                Bcf             GPIO,
                      silenced
```

FIG. 5B

```
silenced
                moviw
                movwf dc3
dlw             moviw 244
                movwf dc'
                        dc1
dlw1    nop
                decfsz dc1
                goto    dlw1
dlw2    nop
                decfsz dc1
                goto    dlw2
                decfsz dc2
                        dlw1
                decfsz dc3
                        dlw
                        waiting
                END
```

FIG. 5C

SYSTEMS FOR MONITORING HAND SANITIZATION

CROSS REFERENCE TO RELATED APPLICATIONS

This application is a continuation-in-part of:

U.S. patent application Ser. No. 15/914,246, filed Mar. 7, 2018, entitled "Systems and Methods for Real-Time Control of Hand Hygiene Sensors and Adaptable Voice and Detection Control," which claims the benefit of and priority to 62/468,158, filed Mar. 7, 2017, entitled "Systems and Methods for Real-Time Control of Hand Hygiene Sensors and Adaptable Voice and Detection Control"; and U.S. patent application Ser. No. 15/392,500, filed Dec. 28, 2016, entitled "Systems for Monitoring Hand Sanitization," which is a continuation of U.S. patent application Ser. No. 14/840,995, filed Aug. 31, 2015, entitled "Systems for Monitoring Hand Sanitization", now U.S. Pat. No. 9,564,039, which is a continuation of U.S. patent application Ser. No. 13/639,669, filed Oct. 5, 2012, entitled, "Systems for Monitoring Hand Sanitization", now U.S. Pat. No. 9,123,233, which is a National Stage entry of and claims benefit of and priority under 35 U.S.C. § 371 to International Application No. PCT/US2011/031571, entitled, "Systems for Monitoring Hand Sanitization" filed on Apr. 7, 2011, which claims the benefit of and priority under 35 U.S.C. §§ 119, 120 to U.S. Provisional Application No. 61/321,595, filed Apr. 7, 2010, entitled, "Systems for Monitoring Hand Sanitization"; all of which are incorporated herein by reference in their entireties.

TECHNICAL FIELD

The disclosure generally relates to sanitization.

BACKGROUND

Approximately 10% of patients who are admitted to hospitals acquire an infection while in the hospital. These infections are typically more serious due to problems with antibiotic resistant strains. These infections not only dramatically increase the cost of care, but more importantly are a cause of substantial morbidity and mortality. The most common method for the spread of nosocomial infections is from direct contact with health care providers' hands. As a result, the CDC has issued recommendations that healthcare providers wash their hands or use an instant hand sanitizer before and after all patient's contacts.

At the present time nearly all hospitals have installed instant hand sanitizer dispensers in all patient rooms and strategically placed signs reminding health care workers to use the dispensers. Despite this improvement, there is at best 50% compliance among health care workers. In most cases the providers are distracted with other responsibilities and simply forget.

Although there are devices designed to monitor sanitization compliance, these devices tend to be impractical in hospital settings, are prohibitively expensive to use on a large scale, and/or would require substantial renovation to implement.

SUMMARY OF THE INVENTION

A hand sanitization system is provided that provides notice to a person of proximity to the system and noncompliance with sanitization protocols. In certain embodiments, the system also provides automated monitoring of compliance with sanitation protocols.

Generally, a hand sanitization system is provided that includes a unit housing, a proximity detector mounted to the housing operative to determine proximity of a person with respect to the detector; a dispenser mounted to the housing and being operative to dispense antiseptic solution; and an alarm mounted to the housing and being operative to provide an indication to the person, the indication corresponding to the person failing to dispense antiseptic solution from the dispenser within a predetermined period of time after moving within a predetermined range of the detector.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 5A is an appendix showing one embodiment of programming the microcontroller.

FIG. 5B is an appendix showing one embodiment of programming the microcontroller.

FIG. 5C is an appendix showing one embodiment of programming the microcontroller.

DETAILED DESCRIPTION

Overview

Figure 1:
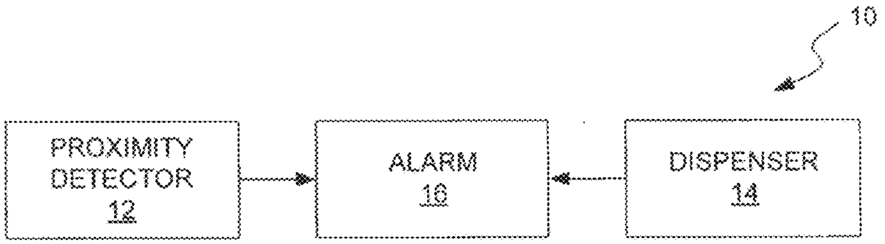
FIG. 1 is a schematic diagram depicting an exemplary embodiment of a system for monitoring hand sanitization.

Systems for monitoring hand sanitization are provided, several exemplary embodiments of which will be described in detail. In this regard, such a system is designed to improve hand sanitization practices in locations such as hospitals rooms. Notably, the CDC recommends that healthcare providers wash their hands or use an antiseptic hand sanitizer before and after each patient contact. The system is configured to serve as a reminder to providers who enter a patient's room, for example, and forget to use a hand sanitizer. If a provider walks by a system sensor and does not use the sanitizer during a potentially variable time period, an alarm may sound until the provider uses the sanitizer.

In various embodiments, the dispenser stations (including one or more sensors) are installed throughout a hospital and/or patient care rooms and are intended to collect information related to the location of healthcare providers, patients, visitors, or other individuals throughout a facility or room. In at least one embodiment, the dispenser stations are connected by a network to a central computer that can be located at, but not limited to, a nursing station or administration offices. In one embodiment, the dispenser stations can communicate with other dispenser stations directly or through network relays, can communicate through central network coordinators, and can communicate with one or more cloud servers. In one or more embodiments, it is possible that each component of the individual network can make decisions independently as a group, or as subgroups within the network. In further embodiments, the system captures, aggregates, and processes the data from the dispenser stations and/or sensors to identify anomalies or patterns that may indicate that there is a high risk or atypical situation based on one or more pieces of data collected by the sensor or network of sensors. In one or more embodiments, the dispenser stations may receive behavior commands that include various protocols with standardized procedures required by a facility. Examples of behavioral commands include but not limited to *clostridium difficile* ("*C. Diff*") protocols, multi resistant drug organisms ("MRDOs") protocols, methicillin-resistant *staphylococcus aureus* ("MRSA") protocols and/or night shift vs. day shift protocols, each of which, in some embodiments, affect the behavior of a dispenser station, sensor, and/or group of dispenser stations.

As will be understood from discussions herein, a hospital, nursing home, and/or facility deploying the disclosed system and methods may install an array of "SOAP" or "ALCOHOL" dispenser stations throughout the building. In some embodiments, a central computer located at a nursing station (or other location) is operatively connected to a data collection server operatively connected to dispenser station(s). In one or more embodiments, data collected by the dispenser stations/sensors and data stored in the computers/servers is analyzed to identify behavior patterns of interest. These behavior patterns can be identified through a combination of data collected by the dispenser station/sensor network as well as pulled from other data sources (e.g., third party computing systems or the like). According to various embodiments, collected data can be used to identify and predict when potentially dangerous situations may occur and information can be relayed to control dispenser station/sensor behavior based on various protocols.

Exemplary Embodiments

An exemplary embodiment of a system for monitoring hand sanitization is depicted schematically in FIG. 1. As shown in FIG. 1, the system (10) includes a proximity detector (12), a dispenser (14) and an alarm (16). The proximity detector determines proximity of a person with respect to the detector. In some embodiments, the proximity detector includes an infrared range finder and a variable potentiometer operative to adjust range sensitivity of the range finder. In some embodiments, the proximity detector is a single, non-directional sensor which detects proximity of a body to the sensor rather than movement of a body in front of the system. The dispenser typically dispenses antiseptic solution, which can be an alcohol-based solution or can be of any other type of sanitizing gel or solution, and provides an output signal to the system corresponding to dispensing of the antiseptic solution. The alarm is operative to provide an indication when there is a failure to dispense based on input criterion. In specific embodiments, the alarm sounds when the person fails to dispense antiseptic solution from the dispenser within a predetermined period of time after moving within a predetermined range of the detector. In some embodiments, the indication can be visual and/or audible. In some embodiments, the period of time is from between 1 second to about 1 minute, or between about 5 seconds and about 45 seconds, or about 10 seconds to about 30 seconds, or is set to at least 1, at least 2, at least 3, at least 4, at least 5, at least 10, at least 15, at least 20 or at least 30 seconds.

Figure 2:
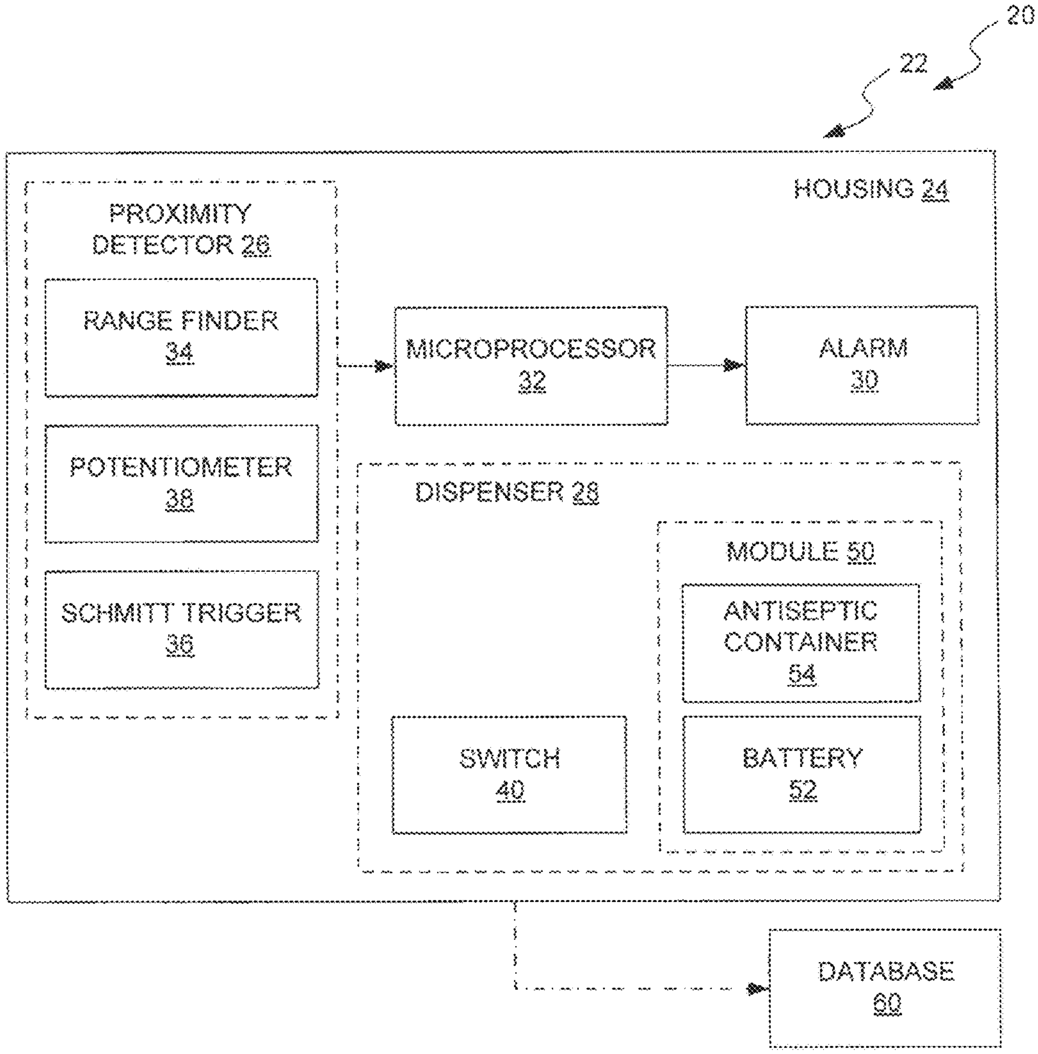
FIG. 2 is a schematic diagram depicting another exemplary embodiment of a system for monitoring hand sanitization.

Another exemplary embodiment of a system for monitoring hand sanitization is depicted schematically in FIG. 2. As shown in FIG. 2, the system 20 includes a sanitization unit 22 incorporating a housing 24, a proximity detector 26, a dispenser 28, an alarm 30 and a microprocessor 32, a switch/usage sensor 40, a radio, memory, an LED, a radio frequency chip (RF), a power source, and one or more optional mechanical switches. It should be noted that these components of the dispenser station are merely exemplary. Dispenser station may include any number of additional components not shown and may function with any number of the components shown removed, as will be understood by one of ordinary skill in the art. It should be understood that each dispenser station may be operatively connected to a mesh network (as further described herein) and may be assigned a particular unique identifier. In various embodiments, each dispenser station may be operatively connected to but not limited to a star, fully connected, or tree network.

In a particular embodiment, the dispenser station is added on to an existing housing and dispenser (e.g., the housing and dispenser are attached to the dispensing station; the dispensing station comes in various connected components that are operatively attached to the housing and/or dispenser, etc.). In further embodiments, the dispensing station includes the dispenser and housing as part of the design (e.g., the dispensing station is not an add-on, but is integrated with the dispenser and housing).

It should also be understood that that a dispenser station (and dispenser and housing) may include, store, and dispense any suitable type of hand hygiene solution and/or product. In various embodiments, the hand hygiene product is soap. In some embodiments, the hand hygiene product is a particular type of soap, such as anti-bacterial soap. In further embodiments, the hand hygiene product is hand sanitizer or hand antiseptic (e.g., any commonly (or uncommonly) produced gel, foam, or liquid with an anti-microorganism substance, typically alcohol).

In various embodiments, the proximity detector/sensor 26 is mounted to the housing and determines proximity of a person with respect to the detector/sensor 26. In at least one embodiment, the dispenser station is mounted to the housing and dispenses antiseptic solution. In one or more embodiments, the alarm is mounted to the housing and provides an indication to a person. By way of example, an alarm/indication may correspond to the person failing to dispense antiseptic solution from the dispenser within a predetermined period of time after moving within a predetermined range of the detector. In some embodiments, the microprocessor 32 receives input from the proximity detector and from the dispenser and provides an output to the alarm based, at least in part, on the inputs received.

Figure 3:
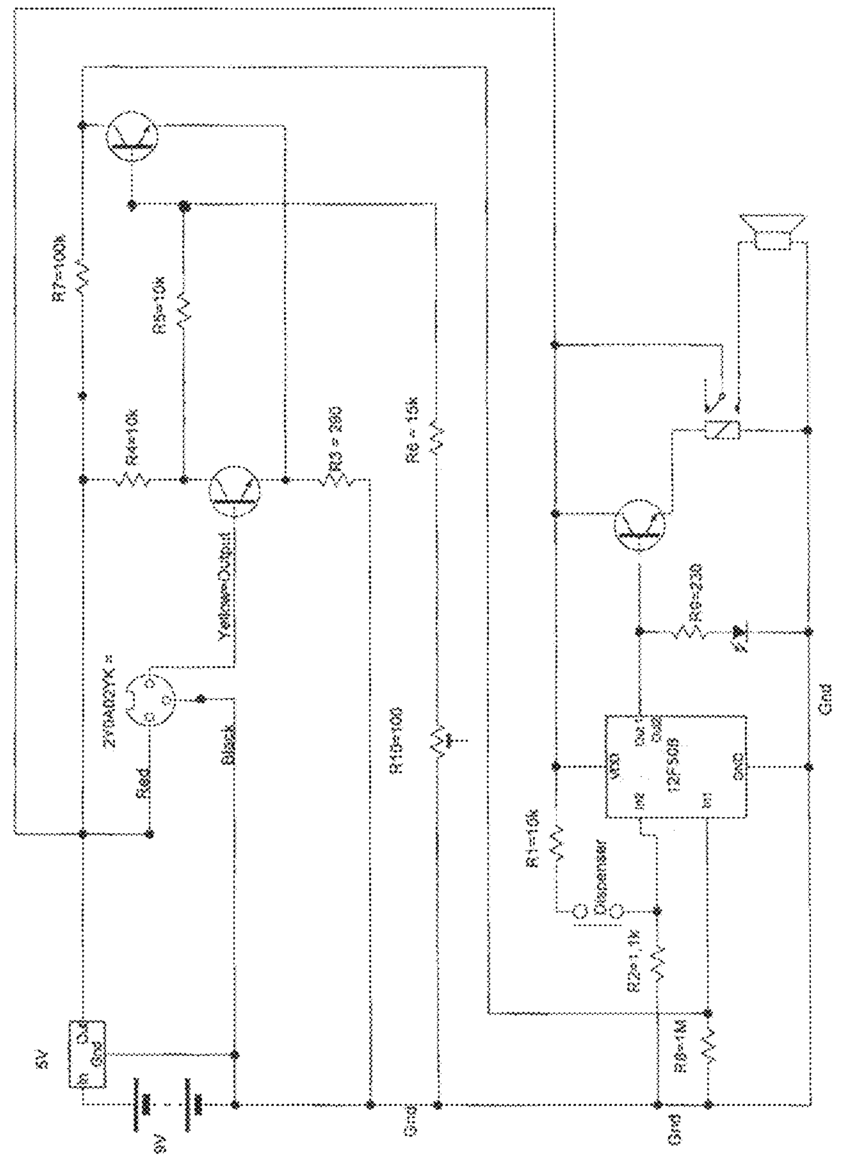
FIG. 3 is a circuit diagram related to another exemplary embodiment of a system for monitoring hand sanitization.

In the embodiment shown in FIG. 2, the proximity detector/sensor 26 includes an infrared (IR) range finder 34, a Schmitt trigger 36 and a potentiometer 38 (also shown in FIG. 3). In some embodiments, the proximity detector relays a signal to the microprocessor that triggers an alarm if an object enters a predetermined field without actuating the dispenser. In at least one embodiment, a proximity detector/sensor 26 is operatively connected to one or more processors (e.g., microprocessor 32). The proximity sensor 26 may be any suitable proximity sensor discussed herein, including, but not limited to an ultrasound sensor, laser sensor, optical/light sensor, heat sensor, radar sensor, sensor that utilizes Wi-Fi, radio waves, etc. The proximity sensor 26 may be configured to receive an indication of a particular object within a predetermined range depending on the type of sensor (e.g., an ultra sound sensor receives sound, etc.). It should be understood that proximity sensor 26 may represent multiple sensors (e.g., multiple ultrasound sensors, etc.).

In at least one embodiment, the proximity detector/sensor 26 may be adjustable. In various embodiments, the proximity sensor 26 is adjustable by a mechanical or digital switch (e.g., one or more mechanical switches). In one or more embodiments, proximity sensor 26 is adjustable via programming received from a data communication server (e.g., data communications server 602), from a website, from a web application, and/or from any other suitable source. It should be understood that proximity sensor 26 may be adjustable in any suitable way, including, but not limited to, adjustable in range (e.g., distance and width of field) and/or adjustable in direction.

A representative example of a range finder is a Sharp GP2Y0A02YK infrared range finder, the output of which is processed to serve as a digital input signal to the microprocessor. The range finder is a self-contained transmitter and receiver that are set parallel to each other. If an object enters the detection field, the IR light that is transmitted is reflected to the detector. The closer an object is to the range finder, the more light is reflected, and the higher the output voltage. This exemplary detector has a range between 20-150 cm and when supplied with a 5V produces a voltage of 0.25-2.3 V depending on the distance.

The output is then converted to a digital signal with the Schmitt trigger. Notably, a Schmitt trigger is a bistable multivibrator that either produces a high or low signal depending on the input signal. The Schmitt trigger use two PNP transistors and a series of five resistors that when combined produce either a high or low voltage. If the input exceeds the $V_{on}$ value, the output from the trigger is high or $V_{cc}$. The value for $V_{on}$ is:

$$Von = \left(\frac{R6 + R10}{R4 + R5 + R6 + R10}\right)Vcc$$

If the input drops below $V_{off}$, the output from the trigger is low or ground. The value for $V_{off}$ is:

$$Voff = \frac{(R6 + R10)\left(Vcc + \frac{R4}{R3}.07\ Vcc\right)}{R4 + R5 + (R6 + R10) + \frac{R4(R6 + R10)}{R3}}$$

A variable potentiometer 38 is used in some embodiments to adjust an effective range of the detector. In the representative circuit of FIG. 3, R10 is a 100Ω potentiometer that when varied changes both the $V_{on}$ and the $V_{off}$. By adjusting the voltage at which the trigger is switched, the potentiometer can vary the distance at which the proximity detector produces a high output voltage.

In some embodiments, the system includes a dispenser switch/usage sensor 40. In various embodiments, the usage sensor 40 is configured to detect one or more actions performed by a user to activate the hand hygiene product dispenser. It should be understood that the usage sensor 40 may be any suitable sensor to detect the action performed by the user to dispense the hand hygiene product. In various embodiments, the usage sensor 40 is a mechanical sensor that detects when the lever of an existing dispenser is pulled (e.g., to dispense the hand hygiene product). In particular embodiments, the usage sensor 40 is configured to detect when the user waves or places their hand in front of a light or motion sensor to indicate they wish the dispenser to dispense the hand hygiene product. It should be understood that in embodiments where the dispenser and/or housing are an integral part of the dispenser station, the usage sensor 40 may be the same sensor used to detect that the user wishes the dispenser to dispense the hand hygiene product.

A representative microprocessor is a Microchip 12F508 microcontroller. In some embodiments, the microcontroller takes inputs from both the Schmitt trigger and dispenser switch 40. In at least one embodiment, the dispenser switch is connected to the hand sanitizer dispenser and closing this switch represents using the sanitizer. In at least one embodiment, based on the two inputs, the microcontroller can in turn activate the alarm. The microcontroller in this embodiment (and others) is programmed (such as shown in the attached FIG. 5) so that if there is a high signal from the Schmitt trigger (corresponding to someone walking in front of the sensor) and the dispenser switch is not closed (indicating that the sanitizer from the dispenser is not used), the alarm will sound until the dispenser switch is closed (indicating that the sanitizer has been used).

In this embodiment (and others), there is a delay built into the program so that there is a three second delay between the time the Schmitt trigger is activated and the sounding of the alarm. This delay is incorporated so that the health care provider has adequate time to use the sanitizer before the alarm sounds. In at least one embodiment, once the dispenser switch is closed, there is a ten second period in which the alarm is silenced. In some embodiments, this delay ensures that the alarm will not sound if the external switch is closed before or while the individual crosses in front of the sensor. Clearly, various delays can be implemented in other embodiments.

Additional features to the circuitry that could be easily added are a photo resistor and a low battery indicator. The low battery indicator could be made with a second Schmitt trigger that could be incorporated or provide input to the microcontroller so that if the battery dropped below a certain voltage (i.e. a low battery) a visual and/or audible alarm could be triggered.

In at least one embodiment, the photo-resistor is a variable resistor that changes voltage based on the light that strikes the surface. This could be incorporated to detect the background light in the patient's room. This would enable the detection of whether the lights are off (i.e. a sleeping patient), and result in either a silenced or reduced volume of the audible alarm, so as not to disturb the patient.

The audible alarm can be a customizable audio recording (or other alarm). In one or more embodiments, the recording is a voice message reminding the healthcare provider to use the hand sanitizer in the event that the user fails to do so while entering or exiting the room. In various embodiments, the combination audio recording chip and microcontroller has the ability to play multiple recordings at varying volumes. In one or more embodiments, the multiple recordings can be used to play randomly selected messages to reduce the potential of conditioning of the providers. Additionally, in some embodiments, multiple recording could be played sequentially in the event that a provider fails to respond to the first message. In further embodiments, the volume of the device could be adjusted based on the ambient light in the room (day/night) or could be varied based on the provider's response.

In one embodiment, a representative audible alarm is a piezo-electric buzzer. In some embodiments, a speaker and driver can be used, among others. The microcontroller could be programmed to emit a variety of tones/buzzers or could be programmed to play a recorded message asking the healthcare provider to use the antiseptic solution. The micro-controller could also be programmed with several tones/recording as to vary the message played. This could help reduce conditioning of the health care providers resulting in them ignoring the system message.

Another feature that is included in certain embodiments is a modular antiseptic and battery pack (50 in FIG. 2). This modular pack would contain a battery 52 and a container 54 of the antiseptic solution to allow easy replacement by healthcare workers. This would simplify replacing both parts. In addition, the module could provide a continual revenue source for the company supplying the device. The modular battery/antiseptic container could also be made refillable/rechargeable to both save money and be environmentally friendly. There could be a centralized filling station that could automatically recharge the battery and also re-fill the dispenser at the same time.

In various embodiments, the system may include an RF chip. In particular embodiments, RF chip communicates with one or more tags (or other components of the system). It should be understood that RF chip may communicate with one or more tags or other components in any suitable way, including, but not limited to, via Bluetooth, low energy Bluetooth, microwaves, Wi-Fi, radio waves, sonar, etc. As discussed above, RF chip may be an integral part of a system-on-a-chip type system. In one embodiment, RF chip and radio are the same device.

One or more processors (e.g., microprocessor 32) may be operatively coupled to a power source. As will be understood by one of ordinary skill in the art, the power source may be any suitable power source such as a battery and/or outlet type electrical source. It should be understood that the power source may be rechargeable by solar energy (via one or more solar panels not shown) and/or via kinetic energy (e.g., the system is configured to harvest energy each time a user pulls a lever to receive hand hygiene product).

The dispenser station 20 may include one or more mechanical switches operatively connected to one or more processors. One or more mechanical switches may include, for example, an on/off switch for the dispenser station, a calibration/adjustment button/switch for proximity detector/sensor 26, a speaker (not shown), and/or a switch to calibrate and/or adjust an audio message played and/or the speaker volume (including turning the speaker off).

It should be understood that, the dispenser station 20 may be integrated with various other systems such as a security system, a hospital EHR system, a hospital census system, human resource systems, payroll systems, medical supply systems, security door databases, etc.

Additionally or alternatively, some embodiments can incorporate a solar cell for providing power to one or more of the electronic components of the system. By way of example, a solar cell (or array of cells) can be mounted to the housing and used to recharge the system battery, such as when the lights are turned on in the room in which the housing is located.

Figure 4:
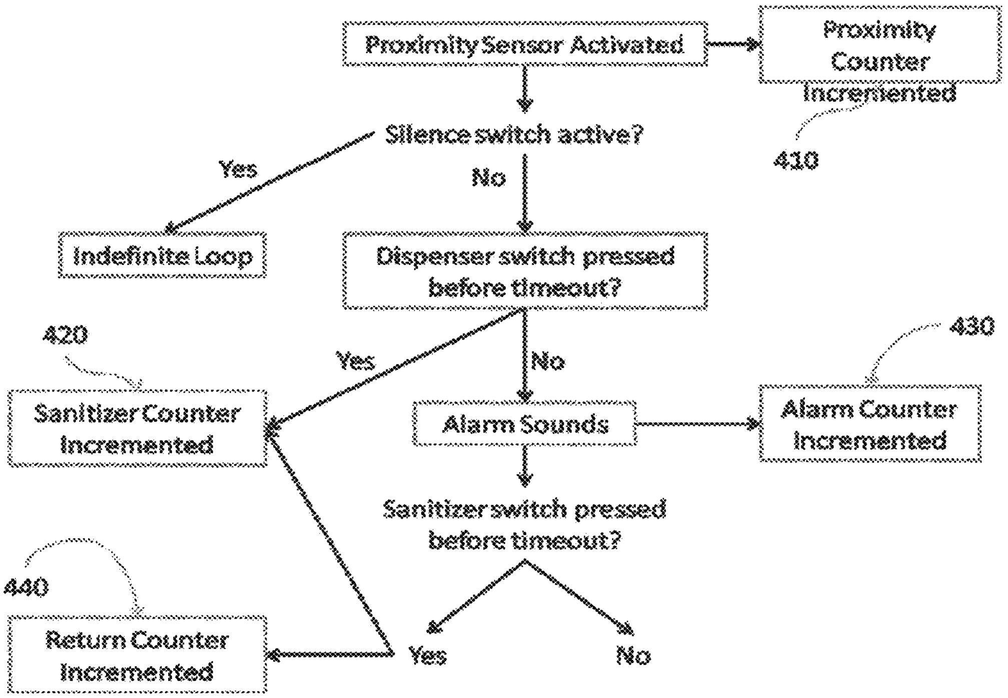
FIG. 4 is a diagram showing an exemplary detection and monitoring sequence.

The device has the ability to track the compliance of all the devices. An exemplary monitoring scheme is shown in FIG. 4. A counter is included to monitor the activation of the Proximity sensor. The proximity sensor action counter 410 can be a physical counter attached directly to the device or can be a remote program or database activated by the activation of the sensor through a wireless network. If the Dispenser dispenses, measured in this embodiment by a dispenser switch (FIG. 2, 40), then another counter 420 is used to identify if the sanitizer switch is pressed before the alarm is activated. As noted above, the period between the proximity sensor activation and alarm is set into the system. If the alarm sounds, a third counter 430 can be used to count the alarm activation. In some embodiments, a fourth "return" sensor 440 is included to identify the activation of the dispenser switch after activation of the alarm. In other embodiments, the system only provides total proximity sensor events and total dispenser activation. In other embodiments, the total alarms are included.

To better monitor the compliance/usage of the sanitizer, data associated with such use could be stored and/or transmitted to another computer/device for recording (such as in a FIG. 2, 60). In some embodiments, the microcontroller is programmed to count the number of times an individual walks past the device, the number of times the antiseptic is dispensed, and also the number of times the alarm sounds. It can also record the number of times that the alarm sounds and a provider returns to use the sanitizer. These numbers can be stored in the device and displayed sequentially on a LED display.

This information could also be transmitted to a second device (either through a wired or wireless device) that could be used to analyze handwashing compliance. At the present time there is no hand sanitizer monitoring device that is widely used in hospitals. The hand sanitizing practices consist of dispensers that are strategically placed and signs reminding health care workers to use them. Even with these improvements the best compliance rates are just approaching 50%. The current compliance tracking requirements are based on tracking aggregate compliance and not individual provider compliance.

An advantage of certain embodiments described herein is active reminders to health care providers to use hand sanitizer. In various embodiments, the system essentially ensures that anyone who walks into or out of a patient room will use the sanitizer. In some embodiments, if a person does not use the sanitizer, an alarm will activate until the sanitizer or the silence button is pressed. There have been other devices that are designed to monitor compliance, but they tend to be impractical in hospital settings, are prohibitively expensive to use on a large scale, or would require substantial renovation to implement them. This system potentially avoids these issues in that it can be stand alone, and very low cost when compared to other devices.

There are certain instances, such as during a code or withdrawal, where it is not appropriate to monitor compliance or play the audio recording. In some embodiments, the device has a switch that can silence the alarm or deactivate the compliance tracking for a predetermined or indefinite period of time.

One of the most important applications for this device is to reduce the incidence and mortality from hospital acquired infections. Roughly 2 million patients per year acquire infections while in the hospital, resulting in approximately 80,000 deaths per year. The most common route of spread is direct contact with health care workers and the commonly accepted solution is to improve hand sanitization practices. In the U.S., there is nearly $6 billion per year spent on treating nosocomial infections, most of which is paid directly by the hospital. According to the American Hospital Association there are roughly 950,000 hospital beds in the U.S., meaning that over $6300 dollars is spent per year just to treat infections acquired while in the hospital. It is estimated that it would cost $250,000 per year (in a 250 bed hospital) for an infection control program that has only achieved a 50% compliance rate in the best of circumstances. This roughly gives a cost of $1000 per bed in each hospital for an infection control program. Multiplying this by the 950,000 beds in the U.S., given an estimate of $950 million dollars per year spent on hospital infection programs.

Various functionality, such as that described above in the flowcharts, can be implemented in hardware and/or software. In the terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such a DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Figure 6:
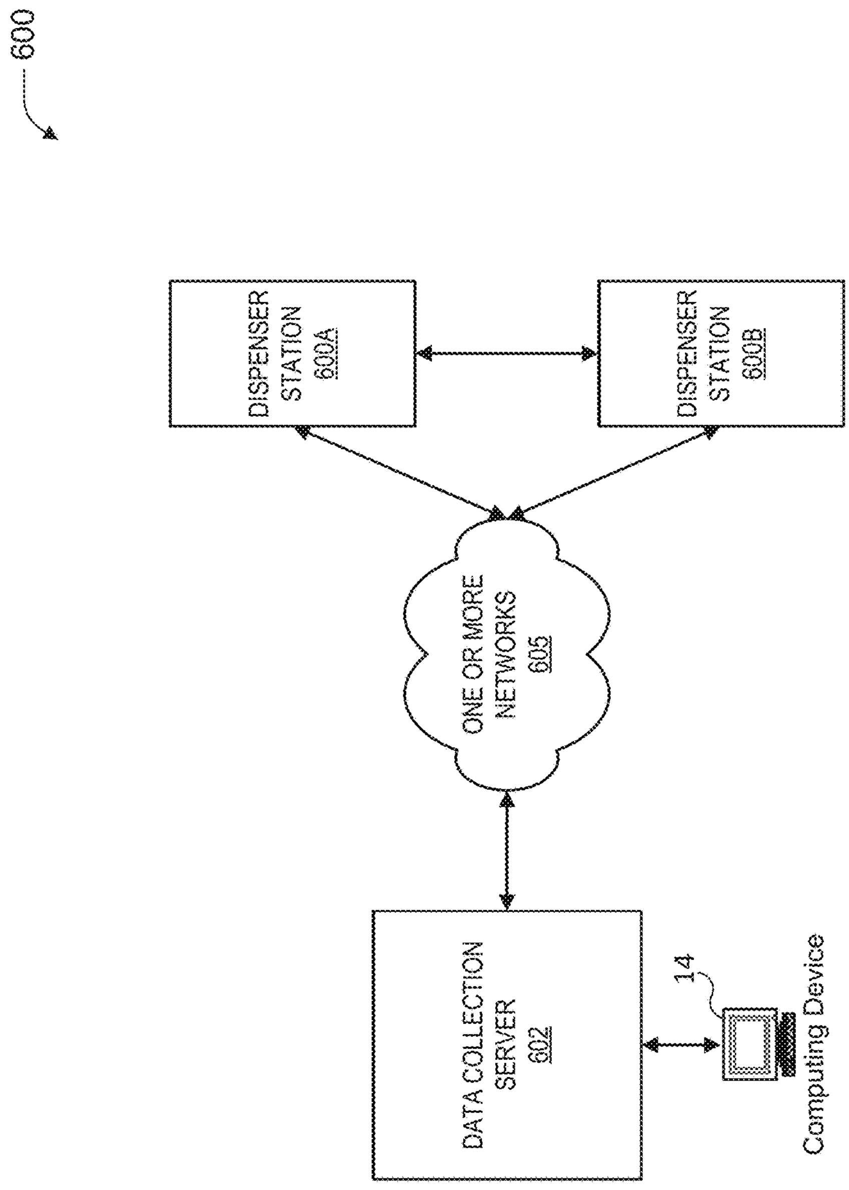
FIG. 6 is an illustration of a high-level exemplary architecture of a system for monitoring hand sanitization, according to one embodiment of the present disclosure.

FIG. 6 depicts a high-level exemplary architecture 600 of various systems and methods disclosed herein. As shown in the embodiment in FIG. 6, the system includes a computing device 14 operatively connected to a data collection server 602 (e.g., database 60 as shown in FIG. 2). Data collection server 602 is, in the embodiment shown, operatively connected to dispenser station 600A and 600B via one or more networks 605. Dispenser station 600A is operatively connected to dispenser station 600B. Dispenser station 600B is operatively connected to dispenser station 600A. Dispenser stations 600A and 600B are merely exemplary. It will be understood by one of ordinary skill in the art that the system may include any number of networks, dispenser stations, tags, data collections servers, and/or computing devices that may be operatively connected to one another (or to specific components of the system). In one embodiment, the system may further include one or more tags configured to communicate with the dispenser stations 600A and 600B and/or the data collection server 602.

In general, in the exemplary embodiment of FIG. 6, each of the devices shown are in operative communication with various other devices. It should be understood, and will be further discussed herein, that various components may be operatively connected in ways not shown in FIG. 6. Additionally, although only one or more networks 605 are shown, it will be understood that the system may include any number of suitable networks, which may be, for example, wireless networks, directly connected (e.g., wired), Bluetooth, mesh networks, or any other suitable type of network.

Exemplary Environment

Figure 7:
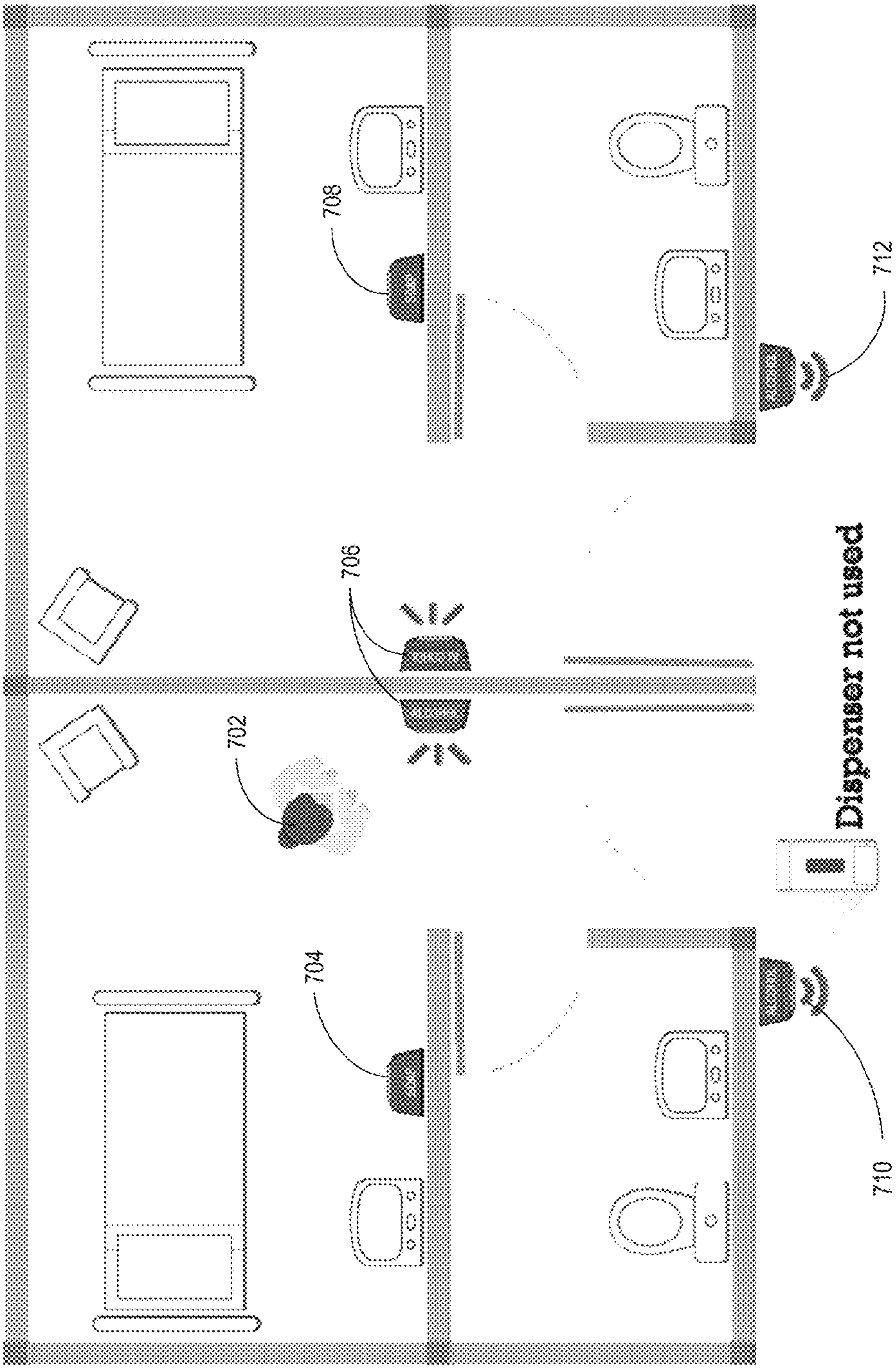
FIG. 7 is an illustration of an exemplary system environment, according to one embodiment of the present disclosure.

As discussed above, various aspects of the present systems and methods relate to identifying an individual across multiple dispenser stations. FIG. 7 shows an exemplary system environment where with an exemplary individual 702 and six exemplary networked dispenser stations 704-712 in operative communication. As shown in this exemplary embodiment, dispenser stations 704 and 708 are "SOAP" stations (e.g., dispenser stations for dispensing soap as a hand hygiene product) and dispenser stations 706, 710, and 712 are "ALCOHOL" stations (e.g., dispenser stations for dispensing an alcohol-based hand hygiene product).

In the embodiment shown, dispenser station 710 detected individual 702 go past the dispenser via one or more proximity sensors without using the hand hygiene product (e.g., the individual 702 did not perform the action to dispense the hand hygiene product). Dispenser station 710 sends, via one or more radios, an indication that individual 702 walked past dispenser station 710 without using the hand sanitizer. Upon receiving this indication, dispenser station 706 plays an audio message reminding individual 702 to use the hand hygiene product.

It should be understood from FIG. 7 and various discussions herein that the system may be configured to identify the range between an individual and a dispenser station, therefore detecting when an individual enters or exits a patient's room.

In various embodiments where more than one dispenser station is networked (e.g., as shown in FIG. 7), the system may coordinate between multiple dispenser stations placed in various locations (e.g., throughout a hospital). One example, would be communication between a dispenser station inside and a dispenser station outside a patient's room to allow a provider to use either the sanitizer inside or outside the room and still receive credit for a successful patient interaction (e.g., the system logs that the individual used the dispenser station according to protocol).

Exemplary Processes

Figure 8:
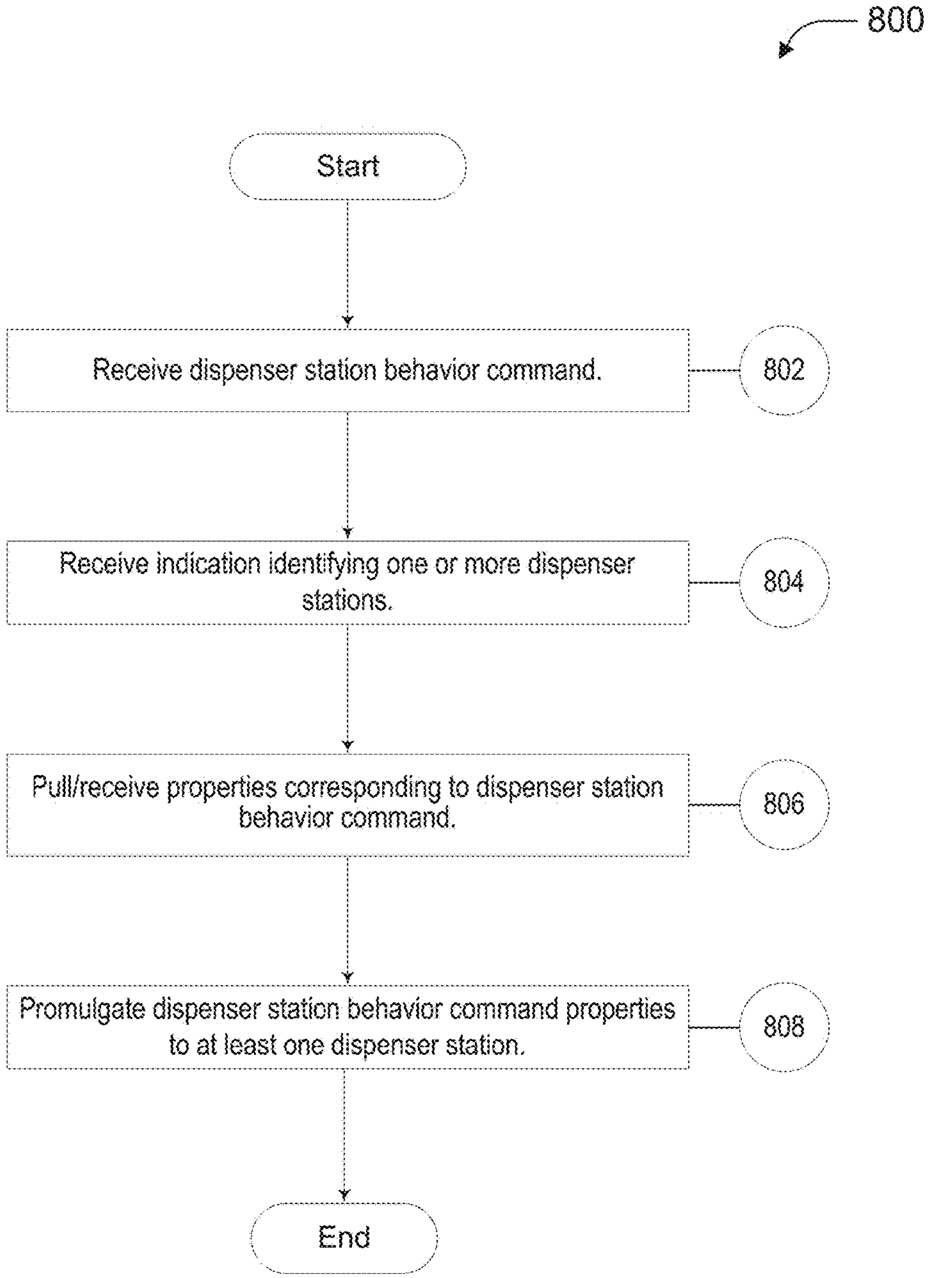
FIG. 8 is an exemplary flowchart illustrating an exemplary behavior command selection and promulgation process, according to one embodiment of the present disclosure.

Turning now to FIG. 8, an exemplary flowchart illustrating an exemplary dispenser behavior command process is shown, according to one embodiment. The process begins at step 802, where the system receives one or more dispenser station behavior command(s). In one or more embodiments, the system receives the one or more dispenser station behavior commands via a drop-down box or other suitable input at a central computing system (e.g., data collection server 602 or the like). In at least one embodiment, the system receives the one or more dispenser station behavior commands by voice command. In some embodiments, the system receives the one or more dispenser station behavior commands from another computing system (e.g., another computing system within a hospital system). In further embodiments, the system receives the one or more dispenser station behavior commands based on electronic medical records of a particular patient (e.g., the patient has a particular condition, such as *C. Diff* or the like and the system creates/receives behavior commands based on this condition).

In some embodiments, the one or more behavior commands are protocols for changing and/or updating functionality of one or more dispenser stations (e.g., a single dispenser station, all dispenser stations, or a subgroup or subgroups of dispenser stations). As will be understood from discussions herein, in one embodiment, the behavior commands may fully update a dispenser station's firmware. In various embodiments, the behavior commands may make temporary changes to a current configuration state of a dispenser station, but not completely reprogram the dispenser station.

As further discussed herein, the one or more behavior commands are various protocols related to particular situations, circumstances, etc. Examples of behavior commands include, but are not limited to, protocols in the event of a *C. Diff*, MRDO and/or MRSA outbreak or protocol procedures regarding a health care provider's interaction with a patient (e.g., during a night vs. day shift). For example, a behavior command related to *C. Diff* may include protocols and/or programming transmitted to one or more dispenser stations outside of a patient's room that is infected with *C. Diff*. Continuing with this example, the behavior command may change the programming of the one of more dispensers from a reminder to use hand sanitizer to a reminder/warning not to enter the *C. Diff*-infected patient's room.

For example, a nurse might manually enter or electronically receive data indicating that a patient has *C. Diff*. The nurse can select the *C. Diff* protocol that is stored in the data collection server from a menu driven user interface wherein choices can be selected on the computing device. The system receives an indication to identify the dispenser station within the *C. Diff*-infected patient's room and the behavior command can modify dispenser behavior to an output that alerts the health professional to use soap instead of alcohol.

In one embodiment, additional patient factors may include but are not limited to, isolation status of a patient, suspected infection of the patient, patient infection or colonization status, patient medical history and risk factors, patients in nearby rooms/units, which staff takes care of specific patients and the risk factors of those patients, status of factors that pose risks to patients (e.g. central lines, catheters, ventilators, post-op surgical status, etc.).

At step 804, the system receives an indication identifying one or more dispenser stations (e.g., the dispenser station or group of dispenser stations that are to receive a behavior commend). In various embodiments, the system receives the indication identifying the one or more dispenser stations via input to the central computing system. In some embodiments, the system is configured to retrieve the indication identifying the one or more dispenser stations from memory (e.g., one or more dispenser stations may be associated with a particular behavior command in memory such that when the particular behavior command is received/selected/etc., the system is configured to retrieve the corresponding indication of the one or more dispenser stations from memory). In a particular embodiment, the system receives the indication identifying the one or more dispenser stations via another computing system, such as, for example, a third-party computing system, a cell phone, a mobile application, and/or another computing system at a hospital, clinic, or the like. In further embodiments, the system receives the indication identifying the one or more dispenser stations via one or more dispenser stations (e.g., a dispenser station or group of dispenser stations indicates one or more dispenser stations that should receive a behavior command).

As will be understood from discussions herein, dispenser stations may be identified by serial number, device number, or the like and may be "grouped" based on type (e.g., soap vs. alcohol-based solution), location (e.g., all dispenser stations near a particular patient's room), floor, etc. In various embodiments, groups or subgroups of dispensers stations are associated with a particular identifier. In these embodiments (and others), the system receives a behavior command at step 802 and receives the particular identifier associated with the group of dispenser stations such that the system can promulgate properties associated with the behavior command (further discussed below) to the dispenser stations associated with the particular identifier.

The identifier may be any suitable identifier such as a number, label (e.g., "FLOOR 11 DISPENSERS"), or the like.

At step 806, the system pulls and/or receives properties corresponding to the received dispenser station behavior command(s). In various embodiments, in response to receiving the dispenser station behavior command(s) and/or the indication identifying the one or more dispenser stations, the system is configured to pull properties from memory (e.g., from a local, remote, or distributed database or databases) corresponding to the dispenser station behavior commands to send to the one or more dispenser stations. In particular embodiments, the system is configured to receive the corresponding properties from a third-party system (e.g., in response to transmitting the dispenser station behavior commands to the third-party system).

In various embodiments, the properties corresponding to the dispenser station behavior commends include one or more changes to a dispenser station component and/or functionality. For example, a property may correspond to (a command or commands for) changing a volume of a dispenser station reminder. As another example, a property may correspond to changing an audio reminder of a dispenser station (e.g., from a voice reminder to use hand sanitizer to a voice reminder to use soap). As yet another example, a property may correspond to activating a light sensor to determine whether it is evening/night and a second property may correspond to lowering a volume of a reminder based on data received from the light sensor (e.g., if the light sensor detects a low light level potentially indicating evening or night, the second property may configure the dispenser station to output audio reminders at a lower volume level).

In one embodiment, the properties may include commands for a dispenser station to transmit a real-time reminder based on a patient or other factors. In one embodiment, the system receives a behavior command related to *C. Diff* protocol and is configured to pull and/or receive properties related to the *C. Diff* protocol, which may include commands and/or programming in which one or more dispenser stations are configured to transmit an audible reminder based on isolation status of the patient (e.g., in response to receiving an indication that someone is within a certain distance of the dispenser station based on a proximity sensor or the like).

In one or more embodiments, the system may be configured to send dispenser station behavior commands to dispenser stations (e.g., without pulling/receiving properties related to the same). In these embodiments (and others) the dispenser stations store may store properties and/or commands associated with the dispenser station behavior commands in memory (e.g., local, remote, and/or distributed).

At step 808, the system promulgates dispenser station behavior command properties to at least one dispenser station. In various embodiments, the system promulgates the dispenser station behavior command properties to at least one dispenser station via a mesh network of dispenser stations. In some embodiments, the system promulgates the dispenser station behavior command properties to at least one dispenser station via wireless protocol (e.g., WiFi, ZigBee, Bluetooth, Bluetooth Low Energy, etc.). In particular embodiments, the system promulgates the dispenser station behavior command properties to at least one dispenser station via a wired connection to one or more dispenser stations. In further embodiments, the system promulgates the dispenser station behavior command properties to at least one dispenser station via a secondary system (e.g., via a hospital system operatively connected to a central computing system and/or one or more dispenser stations; by transmitting the behavior command properties to one or more badges, tags, etc., which then transmit the behavior command properties to one or more dispenser stations; etc.).

Figure 9:
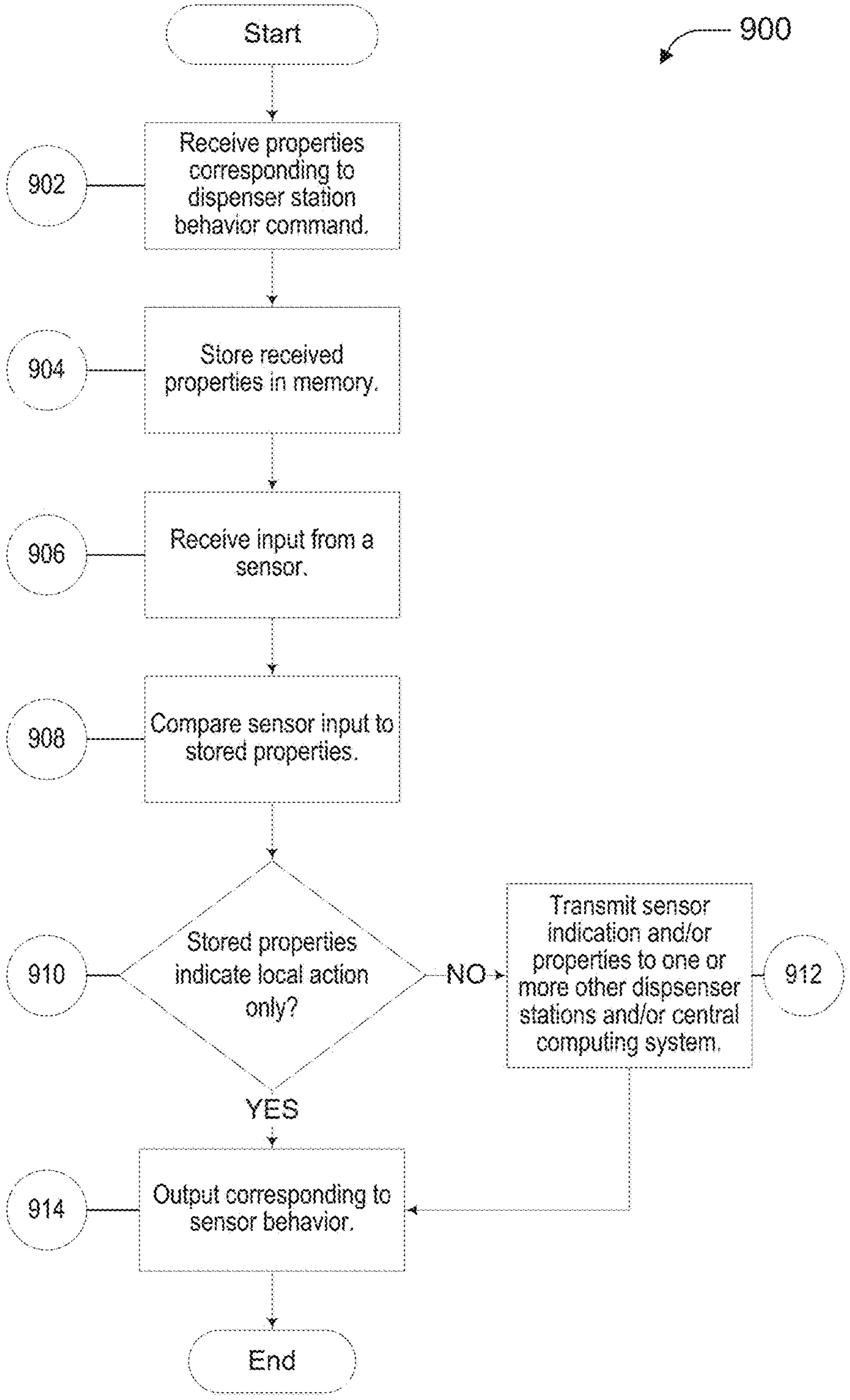
FIG. 9 is an exemplary flowchart illustrating an exemplary behavior command properties implementation process, according to one embodiment of the present disclosure.

FIG. 9 is a flowchart illustrating an exemplary dispenser station. The process begins at step 902, where the dispenser station receives properties corresponding to a received behavior command (e.g., a behavior command as discussed in relation to FIG. 8). In at least one embodiment, the dispenser station receives the behavior command properties from a central computing system (e.g., via a network connection). In at least one embodiment, the dispenser station receives the behavior command properties from another dispenser station (e.g., via a mesh or other network). In some embodiments, the dispenser station retrieves/pulls the behavior command properties from memory and/or the behavior command is loaded on the dispenser station via USB, hardwire, or other medium.

As discussed herein, the dispenser station may receive behavior command properties that change a particular functionality of the dispenser station. In one embodiment, the behavior command properties may change an action executed by the dispenser station in response to a particular sensor input. Continuing with this embodiment, the behavior command properties may correspond to a night shift command/protocol and, based on receiving an indication from a light sensor (e.g., operatively connected to the dispenser station or from another dispenser station), the dispenser station is configured to provide hand sanitization reminders, but at a lower volume (e.g., so as to not disturb sleeping patients).

At step 904, the system stores the received properties in memory. In one embodiment, the architecture of the dispenser station as described in FIG. 2 includes a memory component that stores various data collected, which, in at least one embodiment, may include received properties, sensor data, data received from other dispenser stations, etc. In some embodiments, the system may store the received properties in remote memory (e.g., via a network) and/or distributed databases (e.g., via a blockchain, cloud-based, or other distributed system).

At step 906, the dispenser station receives input from a sensor. As discussed above, the properties corresponding to dispenser station behavior commands may modify the functionality of a dispenser station based on the input received from one or more sensors operatively connected to the dispenser station (see, e.g., FIG. 2). As discussed herein, the dispenser station may receive any suitable input from any suitable sensor, such as, for example, input from a light sensor (e.g., indicating a certain amount of ambient light in a room/area), input from a proximity sensor (e.g., indicating that a person or object is within a certain predetermined distance of the dispenser station), input indicating a particular person, object, or the like is within a certain range of the dispenser station (e.g., the system may be configured to receive a particular identifier or identifiers associated with a particular, person, provider, object, group of providers, group of people, group of objects), etc. As will be understood from discussions herein, the dispenser station may receive the input from the sensor in any suitable way (e.g., via a wired connection, via a wireless connection, via a network connection, via a mesh network, etc.).

At step 908, the system compares received sensor input to the properties stored in memory. As will be understood, the properties stored in memory may be received from a central computing system (e.g., at step 902) or otherwise stored in memory operatively connected to one or more dispenser stations. As discussed herein, the system is configured to compare the received sensor input to the properties stored in memory to determine a next step (e.g., a particular output, a transmission of data to other dispenser stations, etc.).

In one or more embodiments, the system is configured to compare received sensor input to the properties by comparing a numerical value of a sensor input (as received, normalized, and/or converted) to an associated numerical value of one or more properties (e.g., if a received sensor input is a serial number associated with a particular individual (e.g. 1234), the system compares the serial number (1234) to the value of one or more properties (e.g., 2345, 4321, 5432, etc.) to find a match). In some embodiments, the system is configured to compare received sensor input to one or more properties, where the one or more properties include a range to determine whether the received sensor input is within the predetermined range.

At step 910, the system determines whether the stored properties indicate only a local action. As will be understood from discussions herein, a dispenser station may be programmed to take a local action based at least in part on comparing a sensor input (or sensor inputs) to one or more properties. A local action may be, for example, providing an audio and/or visual reminder to an individual to wash their hands and/or use a sanitization device, lowering a volume of all audio reminders for a specific amount of time or until the system receives an additional specific sensor input, or any other suitable action or output by the dispenser station. As will also be understood from discussions herein, depending on the sensor input and the one or more properties, the system may be configured to take action involving additional dispenser stations (in some embodiments, in addition to taking local action).

At step 912, if the system determines that the stored properties do not indicate only a local action, then the system is configured to transmit a sensor indication and/or properties corresponding to one or more other dispenser stations and/or a central computing system. In various embodiments, the system may be configured to take actions involving one or more dispenser stations, including groups and subgroups of dispenser stations based at least in part on input received at one or more sensors at one or more dispenser stations. In these embodiments (and others), the system is configured to transmit information (e.g., sensor data) and/or properties (e.g., instructions) from one dispenser station to one or more additional dispenser stations and/or a central computing system over a network.

As a particular example, the system may identify an individual at a first dispenser station (e.g., via a received identifier or the like), transmit an indication (e.g., one or more properties/instructions) to one or more additional dispenser stations to provide a specific type of reminder to the individual if the one or more additional dispenser stations detect the individual within proximity of the one or more additional dispenser stations.

As discussed above, a dispenser station or group of dispenser stations may be configured to transmit sensor data to a central computing system (to which they are communicably connected) and the central computing system may, in response to receiving the sensor data, transmit properties or other types of commands to various dispenser stations. For example, the system may identify an individual at a first dispenser station (e.g., via a received identifier or the like), transmit an indication to a central computing system, where the central computing system may promulgate properties to one or more additional dispenser stations based on the received indication (e.g., to provide a specific type of reminder to the individual if the one or more additional dispenser stations detect the individual within proximity of the one or more additional dispenser stations).

Dispenser stations may be configured to behave based on information (e.g., sensor input) received at one or more other dispenser stations. For example, one or more dispenser stations may be configured to recognize patterns that may not be identifiable from one individual dispenser station and/or sensor, as such, for example, a group of dispenser stations may share information to distinguish automatically when an individual enters/exits a room within proximity of a dispenser station verses when a stationary object is detected in front of a dispenser station/sensor (e.g., two dispenser stations may identify movement of an individual within proximity of the two dispenser stations). In various embodiments, one or more dispenser stations may also identify when an obstruction or partial obstruction occurs at one dispenser station/sensor and automatically adjust a local dispenser station behavior based on the obstruction (e.g., via one or more properties promulgated by a dispenser station, one or more dispenser stations, via a central computing system, etc.).

In at least one embodiment, the system is configured to control a reminder based on timing or other factors, such as, based on the frequency of patterns of individuals entering or exiting a room. For example, if there is a very high frequency of individuals entering/exiting a patient's room, the dispenser station may control the volume of a reminder, determine whether the a voice reminder was recently played (e.g., and not play a reminder for each person, but for the group as a whole), and/or silence the reminder.

If the system determines that the stored properties indicate only a local action or following the system transmitting a sensor indication and/or properties to one or more other dispenser stations and/or the central computing system (e.g., at step 912), then the system, at step 914, produces an output corresponding to the sensor behavior. As discussed above, the dispenser station may produce any suitable output based at least in part on sensor input. Exemplary outputs may include a reminder to an individual to use hand sanitizer via a speaker or light, changing the volume of the voice reminder based on background ambient noise of the room or hospital unit, changing a visual indicator based on the ambient light level in a patient's room and adjusting the volume of product dispensed or adjusting the type of product that is dispensed based on the role of the individual or the patient in the room, a reminder indicating or recommending soap usage versus hand sanitizer usage if a patient has *C. Diff*, etc.

CONCLUSION

One should note that the flowcharts included herein show the architecture, functionality, and operation of a possible implementation of software. In this regard, each block can be interpreted to represent a module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

One should note that any of the functionality described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" contains, stores, communicates, propagates and/or transports the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of a computer-readable medium include a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical).

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

We claim:

1. A hand sanitization system comprising:

a sanitization unit having:

a proximity detector operatively connected to a housing, the proximity detector operative to determine proximity of a person within a predetermined range with respect to the sanitization unit;

a proximity sensor action counter operatively connected to the proximity detector, the proximity sensor action counter for counting each proximity indication from the proximity detector indicating when the person is within the predetermined range;

a sanitizer action counter operatively connected to a dispenser, the sanitizer action counter for counting each time the dispenser is activated;

an alarm operatively connected to the housing and being operative to provide an indication to the person, the indication corresponding to the person failing to dispense antiseptic solution from the dispenser within a predetermined period of time after moving within the predetermined range of the sanitization unit, wherein the predetermined period of time is adjustable;

an alarm counter operatively connected to the alarm, the alarm counter for counting each time the alarm is activated; and a processor operatively connected to memory, wherein the processor is configured for receiving one or more properties via a network, wherein the one or more properties modify a behavior of the sanitization unit.

2. The system of claim 1, wherein the sanitization unit further comprises a photo-sensor operative to determine ambient light in a vicinity of the unit.

3. The system of claim 2, wherein:

the indication is an audible indication; and the sanitization unit is operative to adjust an audio level of the audible indication based, at least in part, on the ambient light level in the vicinity of the unit.

4. The system of claim 3, wherein the processor adjusts the audio level of the audible indication based at least in part on the one or more properties.

5. The system of claim 1, wherein the processor is operative to receive an input from the proximity detector and from the dispenser and to provide an initial output to the alarm based, at least in part, on the inputs received.

6. The system of claim 5, wherein processor adjusts the initial output based on the one or more properties to a modified output.

7. The system of claim 6, wherein:

the initial output is a first particular audio indication at a first volume level; and the modified output is selected from the group comprising: the audio indication at a second volume level, a second particular audio indication, and a visual indication.

8. The system of claim 6, wherein the one or more properties correspond to a particular behavior command selectable at a central computing system.

9. The system of claim 8, wherein:

the sanitization unit is a first sanitization unit operatively connected to a second sanitization unit and the central computing system via a network; and the first sanitization unit and the second sanitization unit receive the one or more properties from the central computing system via the network in response to the central computing system receiving the particular behavior command.

10. The system of claim 9, wherein the particular behavior command comprises a behavior command corresponding to one or more of: a *c. diff* protocol, a night protocol, an emergency code protocol, and a MRSA protocol.

11. The system of claim 1, wherein:

the behavior of the sanitization unit is an initial behavior, the initial behavior comprising the sanitization unit detecting a particular individual and providing a message to the particular individual; and the modified behavior comprises the sanitization unit detecting the particular individual and providing a different message to the particular individual.

12. The system of claim 1, wherein:

the behavior of the sanitization unit is an initial behavior, the initial behavior comprising the sanitization unit detecting one or more individuals and providing a first message; and the modified behavior comprises the sanitization unit detecting the one or more individuals and providing a different message or no message.

13. A system comprising;

one or more hand sanitization units operatively connected to a central computing system via a network connection, each of the one or more hand sanitization units comprising:

a proximity detector operatively connected to a sanitizer housing operative to determine proximity of a person with respect to the detector, wherein a range of the proximity detector is adjustable and wherein the sanitizer housing comprises a dispenser operative to dispense antiseptic solution and provide an output signal corresponding to dispensing of the antiseptic solution;

an alarm operatively connected to the sanitizer housing operative to provide an indication to the person, the indication corresponding to a first set of properties;

a proximity detector action counter operatively connected to the proximity detector, the proximity detector action counter for counting each proximity indication for the proximity detector indicating when the person is within the predetermined range;

a sanitizer action counter operatively connected to the dispenser for counting each time the dispenser is activated;

an alarm counter operatively connected to the alarm, the alarm counter for counting each time the alarm is activated;

a processor operatively connected memory, the memory storing the first set of properties, the first set of properties corresponding to first particular outputs, and wherein each of the one or more hand sanitization units receives a second set of properties from the central computing system via the network connection, the second set of properties for replacing or modifying the first set of properties and corresponding to second particular outputs.

14. The system of claim 13, wherein the first set of properties correspond to a particular hand sanitization unit providing a particular audio indication to the person, the particular audio indication reminding the person to use antiseptic solution.

15. The system of claim 14, wherein the second set of properties correspond to the particular hand sanitization unit providing a specific audio indication to the person, the specific audio indication requesting the person use soap instead of antibacterial solution.

16. The system of claim 14, wherein the second set of properties correspond to the particular hand sanitization unity providing a specific audio indication to the person, the specific audio indication at a different audio volume level as the particular audio indication.

17. The system of claim 14, wherein:

the particular audio indication comprises a particular verbal message;

the second set of properties correspond to the particular hand sanitization unit providing a specific audio indication to the person, the specific audio indication comprising a specific verbal message;

the specific verbal message is a different message than the particular audio indication.

18. The system of claim 14, wherein the second set of properties correspond to the particular hand sanitization unity providing a visual indication to the person, the visual indication for reminding the person to use antiseptic solution.

19. The system of claim 13, wherein the one or more properties are based on a particular behavior command received at the central computing system.

20. The system of claim 18, wherein the particular behavior command comprises a behavior command corresponding to one or more of: a *c. diff* protocol, a night protocol, an emergency code protocol, and a MRSA protocol.

* * * * *